United States Patent
Lerzer et al.

(10) Patent No.: US 8,619,710 B2
(45) Date of Patent: Dec. 31, 2013

(54) TECHNIQUE FOR PROVIDING NETWORK ACCESS TO DIFFERENT ENTITIES

(75) Inventors: Jürgen Lerzer, Neumarkt/OPf (DE); Morten Christiansen, Arendal (NO); Marcus Mertens, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 431 days.

(21) Appl. No.: 12/809,577

(22) PCT Filed: Dec. 18, 2008

(86) PCT No.: PCT/EP2008/067842
§ 371 (c)(1),
(2), (4) Date: Dec. 20, 2010

(87) PCT Pub. No.: WO2009/080687
PCT Pub. Date: Jul. 2, 2009

(65) Prior Publication Data
US 2011/0090865 A1    Apr. 21, 2011

Related U.S. Application Data

(60) Provisional application No. 61/016,461, filed on Dec. 22, 2007.

(30) Foreign Application Priority Data

Dec. 21, 2007  (EP) .................................. 07025054

(51) Int. Cl.
G08C 17/00   (2006.01)
G06F 15/173  (2006.01)
G06F 15/16   (2006.01)

(52) U.S. Cl.
USPC ............................ 370/331; 709/225; 709/228

(58) Field of Classification Search
USPC ................................... 370/331; 455/436, 439
See application file for complete search history.

(56) References Cited

U.S. PATENT DOCUMENTS

| 6,510,163 B1 * | 1/2003 | Won ............................... 370/466 |
| 2005/0037807 A1 * | 2/2005 | Dove ......................... 455/556.1 |

(Continued)

FOREIGN PATENT DOCUMENTS

| CN | 200944653 Y | 9/2007 |
| EP | 1 827 038 A | 8/2007 |

(Continued)

OTHER PUBLICATIONS

RF-to-digital baseband transceivers simplify mobile WiMAX design, http://mobiledevdesign.com/hardware_news/rf-baseband-transceivers-wimax-design-0927/ (Sep. 27, 2007).*

(Continued)

*Primary Examiner* — Michael Thier
*Assistant Examiner* — Brian Cox
(74) *Attorney, Agent, or Firm* — Potomac Patent Group PLLC

(57) ABSTRACT

A technique for providing network access to an external device is described. A modem device for realizing this technique comprises a first mobile platform module adapted to support network access via a first radio access technology (RAT) and comprising a first data interface towards the external device, as well as a second mobile platform module adapted to support network access via at least one second RAT and comprising a second data interface towards the external device.

16 Claims, 6 Drawing Sheets

(56) References Cited

U.S. PATENT DOCUMENTS

| | | | |
|---|---|---|---|
| 2006/0176852 A1* | 8/2006 | Wu et al. | 370/331 |
| 2006/0270411 A1* | 11/2006 | Grayson | 455/444 |
| 2006/0282557 A1* | 12/2006 | Ogasawara | 710/22 |
| 2007/0073899 A1* | 3/2007 | Judge et al. | 709/246 |
| 2007/0154711 A1* | 7/2007 | Masuda et al. | 428/402.22 |
| 2007/0173283 A1* | 7/2007 | Livet et al. | 455/552.1 |
| 2007/0206553 A1* | 9/2007 | Khushu et al. | 370/338 |
| 2008/0101292 A1* | 5/2008 | Sengupta et al. | 370/331 |
| 2008/0126553 A1* | 5/2008 | Boucher et al. | 709/230 |
| 2008/0281966 A1* | 11/2008 | Jennings et al. | 709/225 |
| 2009/0003277 A1* | 1/2009 | Uppili | 370/331 |
| 2009/0052396 A1* | 2/2009 | Bucker et al. | 370/331 |
| 2010/0198835 A1* | 8/2010 | Sorvari et al. | 707/748 |
| 2010/0220697 A1* | 9/2010 | Liu et al. | 370/338 |

FOREIGN PATENT DOCUMENTS

| | | |
|---|---|---|
| WO | 00/22857 A | 4/2000 |
| WO | 03/075543 A | 9/2003 |
| WO | 2006/078627 A2 | 7/2006 |
| WO | 2006/108174 A2 | 10/2006 |
| WO | 2007/078663 A2 | 7/2007 |
| WO | 2008/057885 A2 | 5/2008 |
| WO | 2009/007217 A1 | 1/2009 |

OTHER PUBLICATIONS

PCT International Search Report, dated Mar. 11, 2009, in connection with International Application No. PCT/EP2008/067842.

Microsoft: "Description of Internet Connection Sharing" Microsoft Knowledge Base, [Online], May 7, 2007, XP002485160. Retrieved from the Internet: URL: http://support.microsoft.com/kb/234815.

Ghosh, A. et al.: "Open application environments in mobile devices: Focus on JME and Ericsson Mobile Platforms" Ericsson Review, [Online], vol. 82, No. 2, Dec. 19, 2005, pp. 82-91, XP002484529, ISSN: 0014-0171. Retrieved from the Internet: URL: http://www.ericsson.com/ericsson/corpinfo/publications/review/2005_02/files/200502.pdf.

New Zealand Examination Report, dated Dec. 15, 2011, in connection with New Zealand Patent Application No. 586223.

PCT International Preliminary Report on Patentability, dated Jun. 22, 2010, in connection with International Application No. PCT/EP2008/067842.

Summons to Attend Oral Proceedings Pursuant to Rule 115(1) EPC, dated Mar. 14, 2012, in connection with EP Application No. 07025054.3.

Venkataraman, Narendra "Inside Mobile IP", Sep. 1, 2005, XP55018405, Retrieved from the Internet: URL:http://drdobbs.com/184406240.

EP Decision to Refuse, dated Dec. 20, 2012, in connection with counterpart EP Application No. 07 025 054.3.

Mo Li et al. "A Multi-Interface Proposal for IEEE 802.21 Media Independent Handover", International Conference on the Management of Mobile Business, 2007: ICMB 2007; Jul. 9-11, 2007, Toronto, Ontario, Canada; Conference Proceedings, IEEE Computer Society, Los Alamitos, California, USA, Jul. 1, 2007, XP031119382, ISBN: 978-0-7695-2803-8.

Chinese Office Action, dated Sep. 13, 2012, in connection with counterpart Chinese Patent Application No. 200880127093.7.

Translation of Chinese Office Action, dated Sep. 13, 2012, in connection with counterpart Chinese Patent Application No. 200880127093.7.

\* cited by examiner

200

┌─────────────────────────────────────────┐
│ PROVIDE A FIRST MOBILE PLATFORM MODULE ADAPTED │
│ TO SUPPORT NETWORK ACCESS VIA A FIRST RADIO │
│ ACCESS TECHNOLOGY (RAT) AND COMPRISING A FIRST │
│ DATA INTERFACE TOWARDS A TERMINAL DEVICE │
└─────────────────────────────────────────┘ ~ 202

↓

┌─────────────────────────────────────────┐
│ PROVIDE AT LEAST ONE SECOND MOBILE PLATFORM │
│ MODULE ADAPTED TO SUPPORT NETWORK ACCESS VIA │
│ AT LEAST ONE SECOND RAT AND COMPRISING A │
│ SECOND DATA INTERFACE TOWARDS THE TERMINAL │
│ DEVICE │
└─────────────────────────────────────────┘ ~ 204

↓

┌─────────────────────────────────────────┐
│ SELECTIVELY ROUTE NETWORK TRAFFIC TO AND/OR │
│ FROM THE TERMINAL DEVICE VIA ONE OF THE FIRST │
│ DATA INTERFACE AND THE SECOND DATA INTERFACE │
└─────────────────────────────────────────┘ ~ 206

Fig. 2

TECHNIQUE FOR PROVIDING NETWORK ACCESS TO DIFFERENT ENTITIES

CROSS-REFERENCE TO RELATED APPLICATIONS

This application claims priority under 35 U.S.C. §119 to European Patent Application No. 07025054.3, filed Dec. 21, 2007, which is hereby incorporated herein by reference in its entirety. This application also claims the benefit of U.S. Provisional Application No. 61/016,461, filed Dec. 22, 2007, which is hereby incorporated herein by reference in its entirety.

TECHNICAL FIELD

The present invention generally relates to the provision of network access via Radio Access Technologies (RATs). Specifically, the invention relates to a technique that permits a device such as a Personal Computer (PC) or laptop to selectively obtain wireless network access via one of several mobile platform modules installed for example on a network card.

BACKGROUND

Mobile telephones have traditionally been voice-centric devices with proprietary operating systems handling all communication tasks. The Application Programming Interfaces (APIs) in these devices were not made available to third-party developers. As a consequence, end users were dependent on the device manufacturers for applications.

Today, the mobile communications industry is increasingly becoming aware of the importance and benefits of open application environments for mobile devices. Basically, an open application environment permits the installation of third party applications on the mobile device during device manufacture or later on by a user operating the device. Such third party applications may include games, software upgrades, etc.

A. Ghosh et al., "Open application environments in mobile devices: Focus on JME and Ericsson Mobile Platforms", Ericsson Review No. 2, Vol. 82, 2005, pages 82 to 91 (ISSN: 0014-0171) describe an exemplary open application environment for mobile devices. The open application environment is based on a mobile platform with a digital baseband processor supporting one or more RATs such as General Packet Radio Service (GPRS), Enhanced Data for GSM Evolution (EDGE) or Wideband Code-Division Multiple Access (WCDMA). The mobile platform is an environment that includes all the necessary integrated circuits and software needed to provide wireless network access services and communication services (e.g. for voice, data or multimedia applications), as well as interfaces to make these services available to applications residing within or on top of the mobile platform.

As wireless access points supporting different kinds of RATs are becoming ubiquitous, it is only a logical consequence that many mobile platform chips provide support for more than one RAT. However, from the perspective of modularity it is sometimes desirable to co-locate in one mobile device two or more platform chips each supporting a different RAT. Such a modular approach facilitates re-using a mobile platform either in a stand-alone configuration or in any combination with other mobile platforms.

WO-A-00/22857 teaches a modular approach in which different network access modules (such as a Local Area Network (LAN) module and a Global System for Mobile communications (GSM) module) are interconnected via a communication bus according to the Universal Serial Bus (USB) standard. Other modules connected to the communication bus such as a Closed-Circuit Television (CCTV) module may then selectively transmit signals via the LAN module on the one hand or via the GSM module on the other.

Mobile platforms are often incorporated in modem devices like network cards that provide wireless network access to terminal devices such as PCs or laptops. Such modem devices often support two or more different RATs to ensure the availability of network access in various environments. Due to modularity considerations, two or more different mobile platforms may therefore concurrently be installed within a modem device.

SUMMARY

Accordingly, there is a need for a technique for efficiently coupling a device with two or more mobile platforms to another device seeking network access.

According to a first aspect, this need is satisfied by an apparatus for providing network access to an external device such as a PC or laptop, wherein the apparatus comprises a first mobile platform module adapted to support network access via a first RAT and comprising a first data interface towards the external device, and a second mobile platform module adapted to support network access via at least one second RAT and comprising a second data interface towards the external device.

By providing each mobile platform module with its own data interface towards the external device, the external device may be selectively and directly coupled to each mobile platform module. Situations in which network traffic is routed from one of the mobile platform modules through another one of mobile platform modules and only then to the external device may thus be avoided.

In accordance with the paradigm of modularity, at least one of the mobile platform modules may be configured to be re-useable either in stand-alone configuration or in a dual (or triple, etc.) mode configuration. In the latter configuration, two or more mobile platform modules may be co-located within the apparatus and provided with inter-platform interfaces.

The apparatus may further comprise at least one control interface adapted to transfer control information towards the external device. Data and control interfaces may generally be differentiated by the transferred type of information. Data information will typically be generated by and/or directed to a user or a user application, whereas control information will typically be exchanged by lower layer components.

In a first implementation, each mobile platform module includes its own control interface towards the external device. In a second implementation, a control interface towards the external device is provided by only one of the mobile platform modules, and this mobile platform module has additional control interfaces towards the other mobile platform modules. Other implementations of the control interface towards the external device are also possible. The at least one control interface towards the external device may be employed to indicate towards the external device an availability of network access via one or more of the RATs.

At least one of the mobile platform modules may further comprise a network interface and a communication path stretching between this network interface and the data interface of this mobile platform module towards the external device. The network interface may be directed towards Radio Frequency (RF) components of the apparatus (such as an RF amplifier and one or more antennas) and may comprise network signalling functionalities.

One or more of the mobile platform modules may further comprise a network address management component adapted to perform network address-related operations. The network address management component may comprise one or more protocol layers of a protocol stack of the respective mobile platform module which are in charge of network address management. Such layers may comprise an Internet Protocol (IP) layer and/or higher layers.

In one or more of the mobile platform modules, the communication path stretching between the local network interface and the data interface towards the external device may be adapted to selectively bypass the local network address management component. In this regard, the communication path may, for example, be adapted not to reach into the IP layer provided in a protocol stack of the mobile platform module unless specifically required by the utilized communication protocol. Accordingly, the selective bypassing of the network address management component may be controlled by the communication protocol in use.

In situations in which several mobile platform modules are provided with dedicated network address management components, the individual network management components deployed on the different mobile platform modules may be adapted to communicate with each other. Such a communication may be performed with the object of network address synchronization among the mobile platform modules. The network address synchronization may include presenting the plurality of mobile platform modules under a single network address (e.g., under a single IP address) to at least one of the external device and the network.

To facilitate inter-platform communication, each mobile platform module may further comprise an inter-platform control interface for inter-platform control signalling. Besides the network address synchronization signalling mentioned above, inter-platform control signalling exchanged via the inter-platform control interfaces could also relate to at least one of a handover between the individual RATs, RAT synchronization, platform module wake-up, and inter-platform Subscriber Identity Module (SIM) card access.

The apparatus may further comprise a hub connecting the data interfaces of the mobile platform modules. The hub may be provided to present the plurality of platform module data interfaces in the form of a single data port towards the external device.

At least one of the mobile platform modules may further comprise an additional data interface to provide a local application residing on the apparatus with network access. Such an application may, for example, be installed on an application platform module co-located with the mobile platform modules within the apparatus and comprising a dedicated application processor. Such additional data interfaces could, of course, also be used for inter-platform data communication.

The individual mobile platform modules may be realized in various ways. In one implementation, each mobile platform module is realized as a separate integrated circuit comprising the respective data interface and, additionally, a digital baseband processor supporting the respective RAT. In one variation, each mobile platform module is constituted by an Application Specific Integrated Circuit (ASIC).

The apparatus may generally be configured as a stationary device or as a mobile device. As for a mobile realization, the apparatus may be configured as at least one of a mobile terminal such as a Personal Digital Assistant (PDA), a mobile telephone and a network card.

The data interfaces towards the external device and the optional inter-platform data interfaces may operate in accordance with one of a plurality of interface standards. In this regard, the USB standard can be mentioned. The data interfaces towards the external device may, for example, be realized as separate USB interfaces presenting the apparatus as Ethernet network card to the external device.

According to a further aspect, a device for obtaining network access via an external apparatus is provided, wherein the device comprises a first data interface adapted to be coupled to the external apparatus to obtain network access via a first RAT supported by the external apparatus, a second data interface adapted to be coupled to the external apparatus to obtain network access via at least one second RAT supported by the external apparatus, and an interface driver binding the first data interface and the second data interface into one logical network interface. The first data interface and the second data interface may be logical interfaces that are physically combined in a single data port of the external device.

The device may be configured as a PC, as a laptop, or as a similar stationary or mobile device. The device may be configured to be removably connected to the external apparatus via a cable (e.g. via a USB cable) or a short-range wireless communication technology such as Bluetooth or any Wireless Local Area Network (WLAN) standard such as the IEEE 802.11 suite.

The interface driver of the device may be adapted to present the logical interface under a single network address to internal components (such as an operating system or an application processor) of the device. Moreover, the device may comprise a control interface adapted to receive control information from the external apparatus, and in such a case the interface driver may be adapted to selectively switch, depending on the control information, to one of the data interfaces of the device.

According to a still further aspect, a method of providing network access to an external device is proposed, wherein the method comprises the steps of providing a first mobile platform module adapted to support network access via a first RAT and comprising a first data interface towards the external device, providing at least one second mobile platform module adapted to support network access via at least one second RAT and comprising a second data interface towards the external device, and selectively routing network traffic to and/or from the external device via one of the first data interface and the second data interface.

The method may further comprise routing network traffic directly between a network interface of each mobile platform module and the respective data interface bypassing one or more (or all) protocol layers in a protocol stack deployed on the mobile platform module. The method may also comprise generating a control signal indicative of a handover between the RATs provided by different mobile platform modules, and sending the control signal to the external device. In the external device, the control signal may control a local switching to either one of the data interfaces provided by the mobile platform modules.

According to a still further aspect, a method of obtaining network access via an external apparatus is provided, wherein the method comprises providing a first data interface adapted to be coupled to the external apparatus to obtain network access via a first RAT supported by the external apparatus, providing a second data interface adapted to be coupled to the external apparatus to obtain network access via at least one second RAT supported by the external apparatus, binding the first data interface and the second data interface into one logical network interface, and selectively routing network traffic over one of the first data interface and the second data interface via the single logical interface.

The method may also comprise, in the case of an internal handover between RATs deployed on different mobile platform modules, the step of switching between the data interfaces of the different mobile platform modules in such a manner that any network access interruptions are avoided. The handover switching may be performed in response to receipt of a control signal from the external apparatus. The control signal may be indicative of the availability of network access via the various RATs supported by the mobile platform modules.

The techniques presented herein may be realised in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a harddisk, and so on.

BRIEF DESCRIPTION OF THE DRAWINGS

Further aspects and advantages of the techniques presented herein will become apparent from the following description of preferred embodiments and the drawings, wherein:

FIG. 2 schematically shows a flow diagram according to a first method embodiment;

DESCRIPTION OF PREFERRED EMBODIMENTS

In the following description of preferred embodiments, for purposes of explanation and not limitation, specific details are set forth (such as particular interfaces, network access technologies and sequences of steps) in order to provide a thorough understanding of the present invention. It will be apparent to one skilled in the art that the present invention may be practiced in other embodiments that depart from these specific details. For example, while the embodiments will primarily be described in context with third and fourth generation mobile communications standards such as the UMTS and LTE standards, respectively, it will be evident that the present invention can also be practised in connection with a second generation mobile communications technology according to, for example, the GSM standard.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

Figure 1:
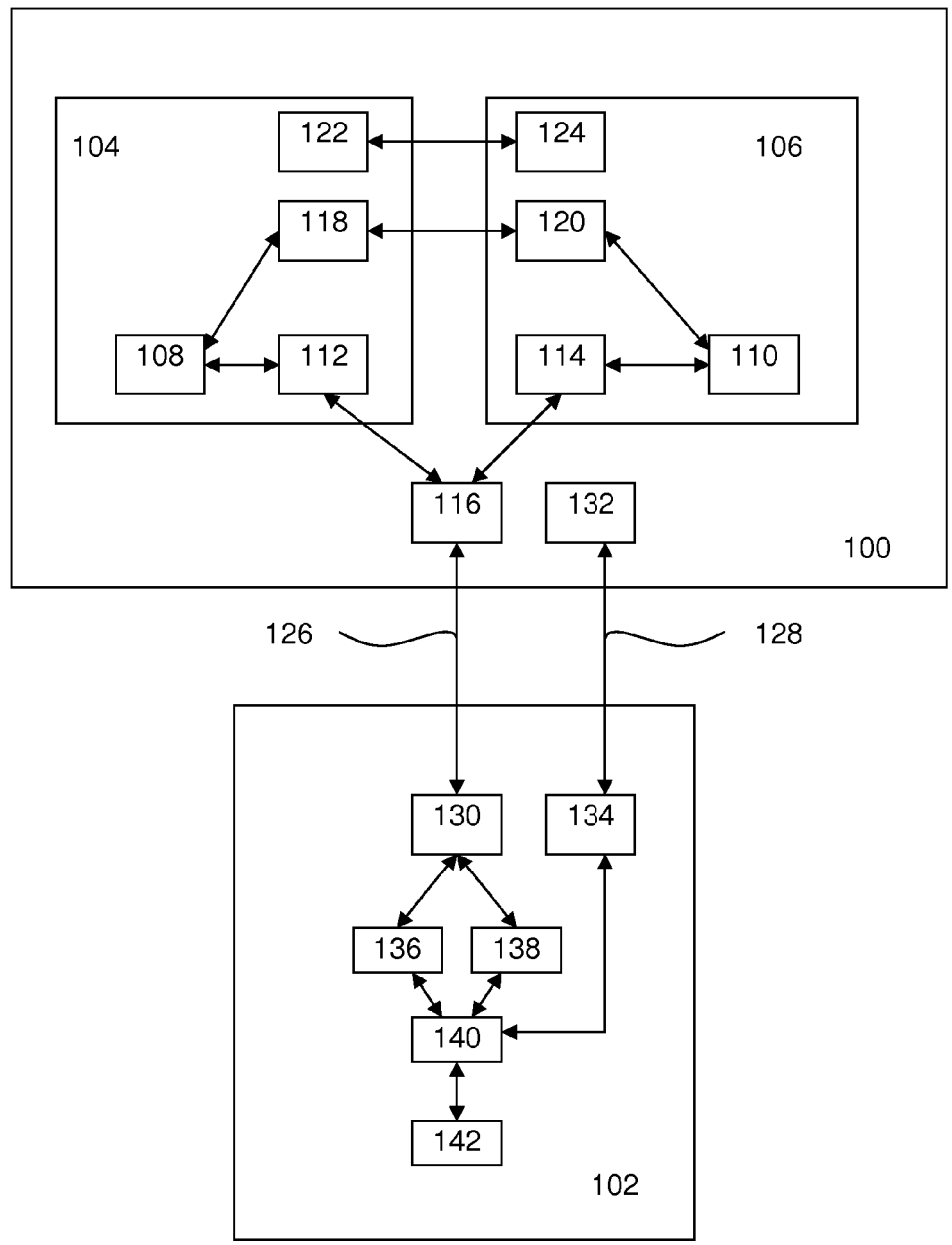
FIG. 1 shows an exemplary communication system with a modem device embodiment and a terminal device embodiment.

FIG. 1 shows an exemplary communication system comprising an embodiment of a modem device 100 as well as an embodiment of a terminal device 102. In one example, the modem device 100 is configured as a network card, and the terminal device 102 is configured as a laptop having a standard slot for receiving the network card.

The modem device 100 comprises two mobile platform modules 104, 106 each supporting one or more RATs and each realized in the form of a separate platform chip. Support for a specific RAT includes the provision of at least one dedicated baseband processor 108, 110 for this RAT on the respective mobile platform module 104, 106. Each mobile platform module 104, 106 may further comprise dedicated RF components (such as RF amplifiers), or such RF components may be jointly used by the mobile platform modules 104, 106.

The mobile platform module 106 may be provided in the form of a platform main chip supporting one or more existing or legacy RATs such as EDGE, WCDMA, GSM or High Speed Packet Access (HSPA) radio technologies. The other mobile platform module 104 may be provided in the form of a platform co-chip containing one or more novel RATs such as LTE or evolved HSPA (eHSPA).

The provision of two separate mobile platform modules 104, 106 has some advantages such as an increased assembly flexibility and a reduced time-to-market due to a decreased complexity. The higher flexibility results from the modular approach which permits to selectively implement the mobile platform modules 104, 106 either in stand-alone solutions or in dual-mode solutions as shown in FIG. 1.

The mobile platform modules 104, 106 comprise a plurality of interfaces. First of all, each mobile platform module 104, 106 comprises a data interface 112, 114 towards the terminal device 102. The data interfaces 112, 114 are configured to be used by the terminal device 102 to obtain network access via the one or more RATs supported by each mobile platform module 104, 106. In one implementation, the data interfaces 112, 114 are realized in accordance with the USB standard. Specifically, the data interfaces 112, 114 may be configured in accordance with a USB device class presenting the mobile platforms 104, 106 as Ethernet network cards towards the terminal device 102. Suitable USB device classes providing Ethernet via USB include, for example, USB CDC ECM, USB CDC EEM, USB CDC ENCM, and USB NCM.

In the embodiment shown in FIG. 1, the two data interfaces 112, 114 are connected to a hub 116 presenting the two data interfaces 112, 114 in the form of a single physical data port towards the external device 102. Accordingly, while there exist two logical USB Ethernet devices on the two mobile platform modules 104, 106, only a single physical USB port will be presented towards the external device 102. It should be noted that the data interfaces 112, 114 towards the external device 102 need not necessarily be configured in accordance with the USB standard. Other possible interface standards include the Universal Asynchronous Receiver/Transmitter (UART) standard or any proprietary standard.

As shown in FIG. 1, the mobile platform modules 104, 106 additionally include inter-platform data interfaces 118, 120. These inter-platform data interfaces 118, 120 allow for a user data transfer between the two mobile platform modules 104, 106. Such a user data transfer may, for example, be required if an application residing within or on top of mobile platform module 106 wishes to obtain network access via the RAT provided by mobile platform module 104, and vice versa. The inter-platform data interfaces 118, 120 may be configured as USB interfaces, and in such a case the interface on one platform module implements the UBS host role, and the interface on the other platform module implements the USB device role. Of course, other interface standards including UART and proprietary standards can be used also.

In addition to the data interfaces 112, 114 towards the external device and the inter-platform data interfaces 118, 120, the mobile platform modules 104, 106 comprise inter-platform control interfaces 122, 124. The inter-platform control interfaces 122, 124 will be utilized for the exchange of control signalling between the two mobile platform modules 104, 106. Such control signalling may include Internal RAT (I RAT) synchronization, I RAT handover, SIM access from one platform module to the other platform module (in such a case only a single one of the two mobile platform modules 104, 106 needs to provide SIM access functionalities), and system control signalling including platform module wake-up functionalities. The control interfaces 122, 124 can be configured in accordance with the UART standard, the USB standard, the General Purpose Input/Output (GPIO) standard or any proprietary standard. In the case the control interfaces 122, 124 are configured in accordance with the USB standard, they may at the same time be utilized for user data transfer, and in such a case the two inter-platform data interfaces 118, 120 may be omitted.

The modem device 100 communicates with the terminal device 102 via a data connection 126 on the one hand and a control connection 128 on the other. The data connection 126 stretches from the physical port of the USB hub 116 to a physical USB port 130 of the terminal device 102. The control connection 128, on the other hand, stretches between a control interface 132 of the modem device 100 and a corresponding control interface 134 of the terminal device 102. The control interfaces 132, 134 may be configured in accordance with the UART standard or any proprietary standard. Alternatively, the control interfaces 132, 134 could be omitted and control signalling be exchanged via the link between the port provided by the USB hub 116 and the USB port 130 of the terminal device 102.

As shown in FIG. 1, the terminal device 102 comprises a first data interface 136 and a second data interface 138 which are adapted to be coupled to the modem device 100 to obtain network access via the RATs supported by the modem device 100. Specifically, the first data interface 136 is a logical USB interface adapted to be coupled to the corresponding USB interface 112 of the mobile platform module 104 to obtain network access via the one or more RATs provided by the mobile platform module 104, and the second data interface 138 is a logical USB interface adapted to be coupled to the corresponding USB interface 114 of the mobile platform module 106 to obtain network access via the one or more RATs provided by the mobile platform module 106.

The terminal device 102 further comprises an interface driver 140 adapted to bind a first data interface 136 and the second data interface 138 of the terminal device 102 into one logical network interface. As a consequence, any application 142 of the terminal device 102 requiring network access will not see the two separate data interfaces 112, 114 of the modem device 100, but will only see the single logical network interface provided by the interface driver 140.

The interface driver 140 is coupled to the control interface 134 to receive control information indicative of the availability of the RATs supported by the mobile platform modules 104, 106. The interface driver 140 will thus selectively switch either to the first data interface 112 or to the second data interface 114 depending on the control information received via the control interface 134.

Figure 3:
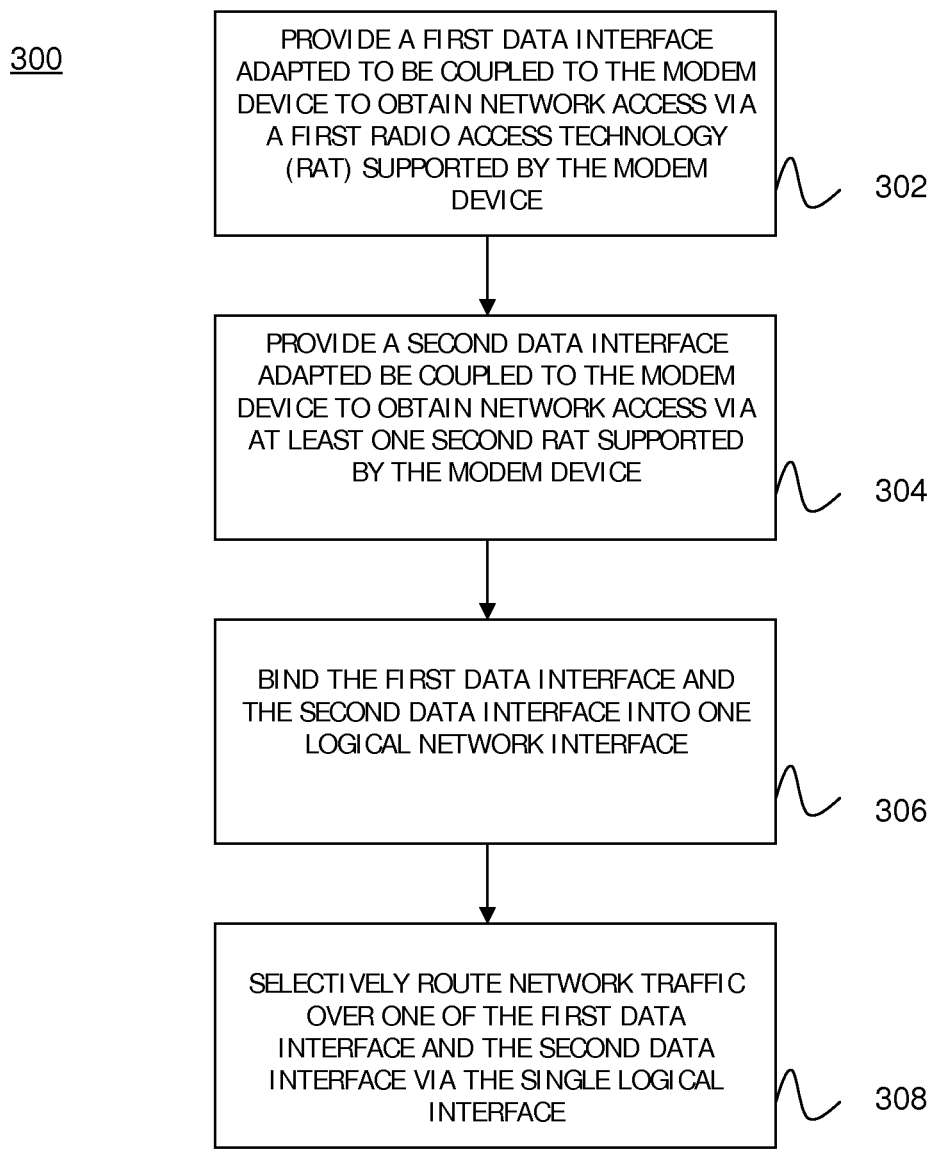
FIG. 3 schematically shows a flow diagram according to a second method embodiment.

The flow diagrams 200, 300 shown in FIGS. 2 and 3 illustrate the basic operations of the modem device 100 and the terminal device 102 illustrated in FIG. 1.

With respect to the flow diagram 200 of FIG. 2, the operation of the modem device 100 starts with the provision of the two mobile platform modules 104, 106 and the associated data interfaces 112, 114 in steps 202 and 204. In a further step 206, network traffic to and/or from the terminal device 102 is selectively routed via one of the first data interface 112 and the second data interface 114.

As for the operation of the terminal device 102 illustrated in the flow diagram 300 of FIG. 3, the operation starts with the provision of the two data interfaces 136, 138 that are adapted to be coupled to the modem device 100 to obtain network access via the RATs supported by the modem device 100 (steps 302 and 304). In a next step 306, the two data interfaces 136, 138 are bound by the interface driver 140 into one logical network interface. Then, in step 308, network traffic is selectively routed over one of the two data interfaces 136, 138 via the single logical interface created in step 306.

Figure 4:
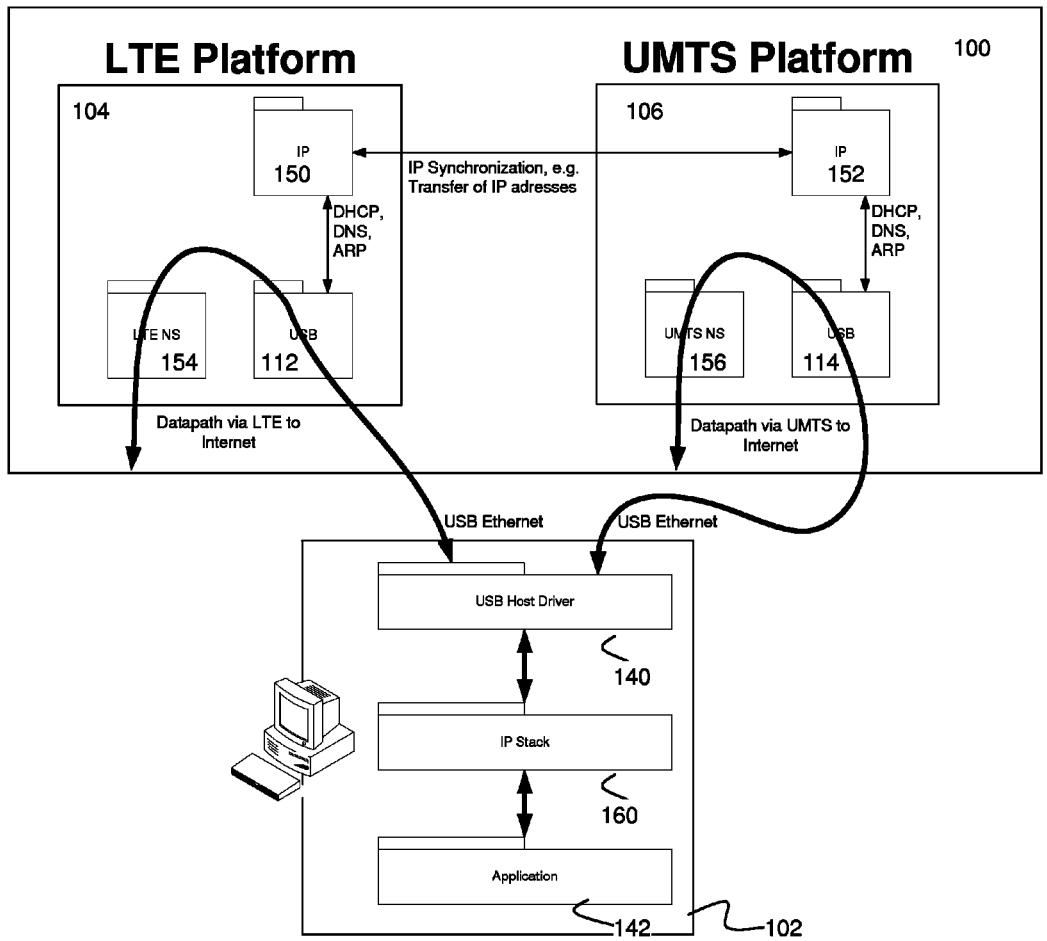
FIG. 4 shows an exemplary communication system with a second modem device embodiment and a second terminal device embodiment.

FIG. 4 shows a further system embodiment that may be derived from the system embodiment discussed above in context with FIG. 1. The same reference numerals will thus be used to identify the same or similar components.

In the embodiment shown in FIG. 4, the modem device 100 is again a dual-mode device comprising a first mobile platform module 104 supporting the LTE RAT and a second mobile platform module 106 supporting the UMTS RAT. In addition to the components already discussed in context with FIG. 1 (and which are therefore partly not shown in FIG. 4), each mobile platform module 104, 106 additionally comprises a network address management component 150, 152 in the form of an IP module with IP layer functionalities. The network address management components 150, 152 are configured to communicate with each other via the control interfaces 122, 124 shown in FIG. 1 (not shown in FIG. 4). This inter-platform communication between the two network address management components 150, 152 aims at synchronizing the IP stacks maintained by each network address signalling component 150, 152. Such a synchronization includes the transfer of an IP address, that has been allocated by the network, between the respective IP stacks. After the IP stack synchronization, the two mobile platform modules 104, 106 will act towards the outside world (i.e., towards the network and towards the terminal device 102), as if the modem device 100 had only a single IP stack.

As can be gathered from FIG. 4, each mobile platform module 104, 106 further comprises a network signalling module 154, 156 that constitutes an interface towards the associated access network. The network signalling modules 154, 156 are in charge of the signalling required to establish and maintain a network connection (e.g., a connection to the Internet) via the associated RAT.

Each of the mobile platform modules 104, 106 provides an external USB device data interface 112, 114, respectively, to an USB host driver 140 of the terminal device 102. The UMTS platform module 104 is therefore configured to present itself as USB Ethernet Network Access Point (NAP) device to the USB host driver 140 giving the USB host Internet access using UMTS RAT via USB Ethernet. In a similar manner, the LTE platform module 106 is configured to present itself, via the USB device interface 114, as USB Ethernet NAP device to the USB host driver 140, thus giving the USB host Internet access using LTE RAT via USB Ethernet. The USB host driver 140 is adapted to bind these two USB Ethernet devices presented by the two data interfaces 112, 114 into one logical network interface with the same IP address. Accordingly, an operating system (with an associated IP stack 160) and an application 142 running on the operating system only see a single network device instead of two dedicated mobile platform modules 104, 106.

As already mentioned above in context with FIG. 1, the two logical USB Ethernet devices presented by the two data interfaces 112, 114 can optionally be merged by a USB hub 116 so that only a single physical USB port or interface is presented towards the terminal device 102.

An aspect that should be mentioned with respect to the system embodiment shown in FIG. 4 is the fact that the data path within each individual mobile platform module 104, 106 may include an IP shortcut between the data interfaces 112, 114 on the one hand and the network signalling modules 154, 156 on the other. This shortcut constitutes a direct link for IP packets containing user data bypassing the respective network address management component 150, 152. Basically, these components 150, 152 only have to be included in the data path in case of IP packets involving for example the Address Solution Protocol (ASP), the Dynamic Host Configuration Protocol (DHCP) and the Domain Name System (DNS) standard. In case the IP shortcut illustrated in FIG. 4 is not implemented, all IP packets are routed through the associated network address management component 150, 152.

Certain scenarios may require an I RAT handover during an ongoing data session. Such a handover may occur from the LTE RAT to the UMTS RAT or vice versa depending on considerations such as RAT signal strengths, network access costs, quality-of-service, and the like. In the case of an I RAT handover, the switching from one RAT to the other is in one scenario not done inside the modem device 100, but inside the terminal device 102 by the USB host driver 140 (for example by switching from the USB Ethernet connection provided by the UMTS platform module 106 to the USB Ethernet connection provided by the LTE platform module 104 or vice versa). This switching is done such that there will be no service disconnection when changing from one RAT to the other RAT.

Since the switching is controlled by the USB host driver 140, there has to be a mechanism that indicates to the USB host driver 140 which USB Ethernet connection is currently the one with the active RAT. Such a mechanism can be based on the control connection 128 discussed above in context with FIG. 1. The generation of the corresponding switching control signal within the modem device 100 can consider various strategies. According to a very simple strategy, the user data will always be routed to the fastest available USB Ethernet device (which will be presented by the LTE platform module 104 in the present embodiment and which will only be available if the LTE RAT is active).

The decision strategy underlying the generation of the switching control signal could also be more advanced. For example, the LTE platform module 104 may direct the USB host driver 140 via the control connection 128 (see FIG. 1) by notifications from an LTE USB Ethernet notification pipe to prepare and execute handover between the USB Ethernet devices presented by the data interfaces 112, 114. It is possible that either the LTE platform module 104 or the UMTS platform module 106 controls the generation of the switching control signal for the USB host driver 140. However, it is also conceivable that the LTE platform module 104 sends the connection status of the LTE RAT and the UMTS platform module 106 the connection status of the UMTS RAT via separate switching control signals to the USB host driver 140 to enable a decision within the terminal device 102.

The USB host driver 140 may be configured to communicate in accordance with the Network Driver Interfaces Specification (NDIS) towards the application 142. NDIS is an Application Programming Interface (API) for Network Interface Cards (NICs). As mentioned above, the USB host driver 140 combines the two Ethernet devices represented by the two data interfaces 112, 114 and presents both as a single NIC towards the application 142. In this regard, the USB host driver 140 may simply indicate to the application 140 whether there is an NIC connected to the Internet or not. However, the signalling of the USB host driver 140 towards the application 142 does not distinguish between which of the two USB Ethernet devices is connected.

Figure 5:
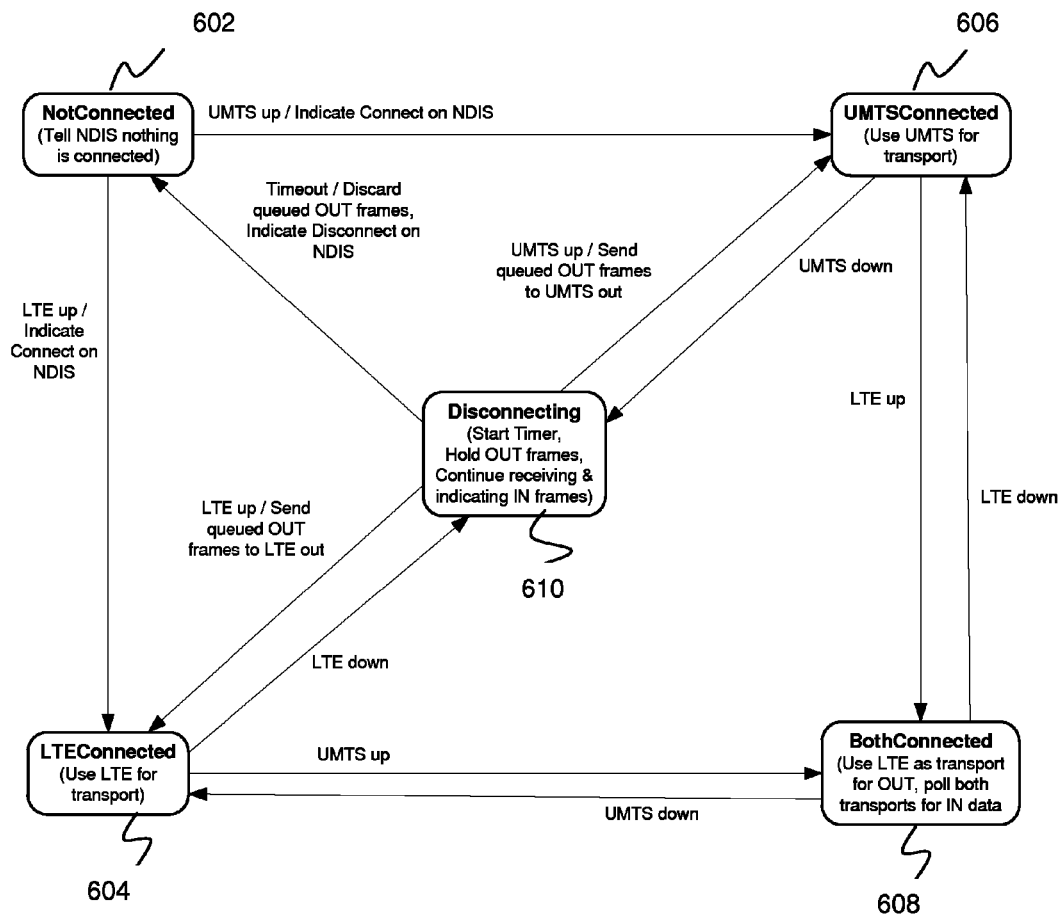
FIG. 5 shows a state diagram in relation to the modem device embodiment of FIG. 4.

From the connection status of the LTE USB Ethernet device (data interface 112) and the connection status of the UMTS USB Ethernet device (data interface 114), the USB host driver 140 may determine the connection status of the NIC. FIG. 5 shows an exemplary state diagram showing the various possible states. A first state 602 indicates that neither an LTE connection nor an UMTS connection is available. State 604 indicates the availability of an LTE connection only and state 606 indicates the availability of an UMTS connection only. The availability of both connections is represented by state 608. State 610 represents a disconnecting state. In this regard, OUT denotes the direction from the USB host (terminal device 102) to the USB device (modem device 100), and IN the inverse direction.

As becomes apparent from FIG. 5, there is no direct transition from any connected state 604, 606, 608 to the state 602 representative of a lacking connection. Rather, the disconnecting state 610 (and an associated timer) always intercepts a transition from any of the states 604, 606, 608 to the state 602. If one or both of the LTE RAT and UMTS RAT go down, the timer is started, and only if neither one of the two RATs has gone up before expiry of the timer, the disconnected state 602 will be assumed again. The provision of the disconnected state 610 provides the advantage of a more stable system operation in case of only brief network access failures.

As has become apparent from the above description of preferred embodiments, it is advantageous to provide each mobile platform module 104, 106 with its own data interface 112, 114 towards the terminal device 102. Such a solution avoids the drawbacks associated with scenarios in which only a single mobile platform module realizes such a data interface towards external device 102 as illustrated in FIGS. 6A and 6B.

Figure 6A:
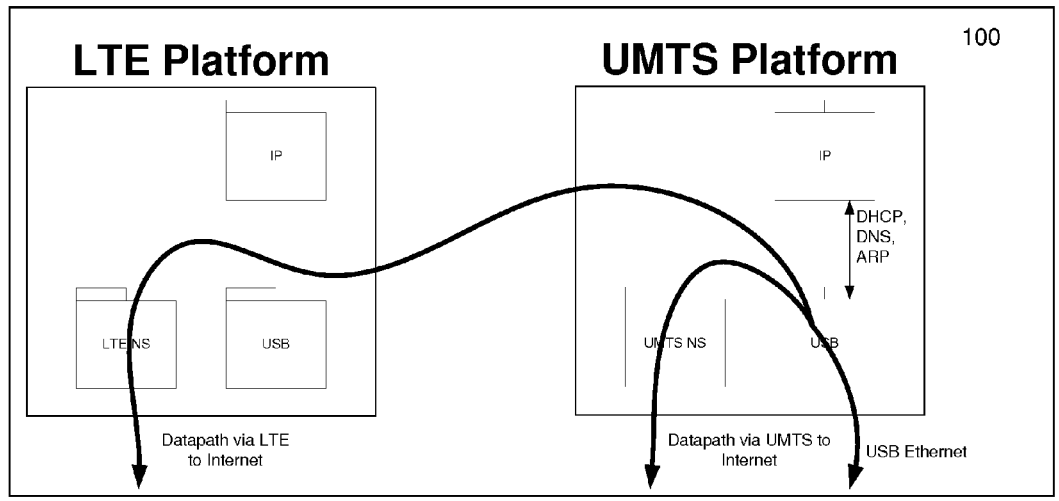
FIG. 6A shows dual platform module modem devices with only a single data interface and 6B towards an external device.

In FIG. 6A, the UMTS platform module implements the external USB device interface. When UMTS is the active RAT, user data is completely handled on the UMTS platform module. However, in cases in which there is a handover to the LTE RAT, user data has to be transferred between the two platform modules. FIG. 6B illustrates a similar case in which the LTE platform module implements the external USB device interface. When LTE is the active RAT, user data is completely handled on the LTE platform module. However, in cases whether is a handover to the UMTS RAT, user data needs again to be transferred between the two platform modules.

Figure 6B:
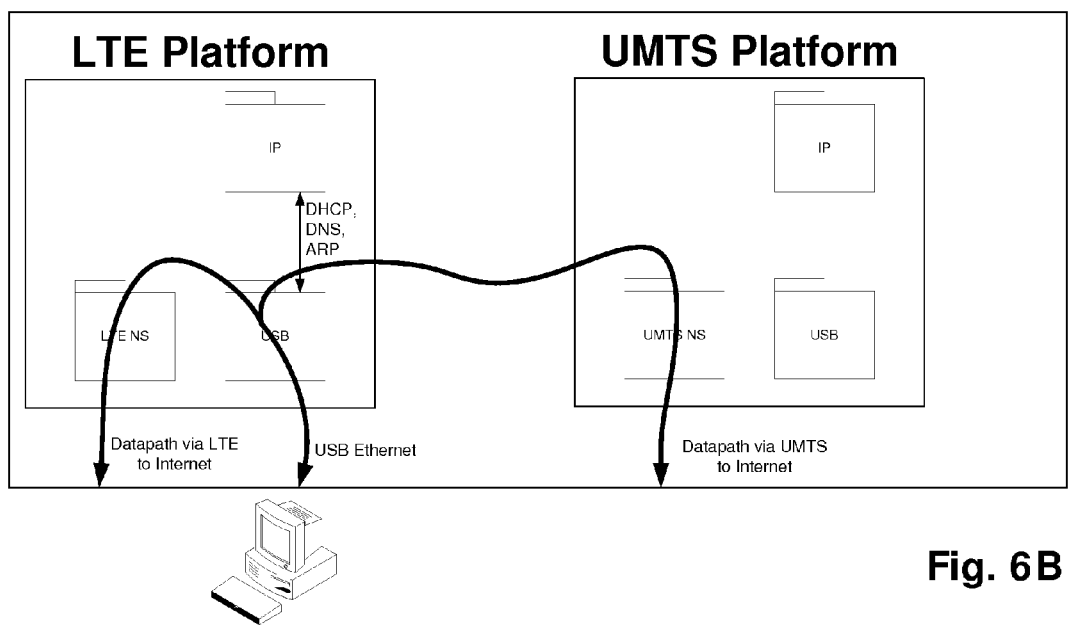

In relation to the scenarios illustrated in FIGS. 6A and 6B, the solution presented by the embodiments has the advantage of a lower power consumption as no inter-platform data interface needs to be powered up because each platform module can autonomously handle the user data transfer to the external device. A further advantage results from the fact that if LTE is the active RAT, no routing of the user data through the typically slower UMTS platform module is required. The resulting performance limitations can thus be avoided.

The solution of having platform-specific data interfaces towards the terminal device also simplifies other platform-specific functionalities via these data interfaces, such as debugging, flashing, data mass storage and the like. Moreover, existing software tools for these purposes can be reused as each platform module can be accessed separately.

Also, the development efforts inside the platform modules are decreased as the user data path is the same as for conventional stand-alone cases (i.e., for modem devices comprising only a single mobile platform). There is thus no need to implement a specific user data path for the case in which one mobile platform module handles the interface towards the terminal device and the other mobile platform module handles the network access as shown in FIGS. 6A and 6B.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. An apparatus for providing network access to an external device, the apparatus comprising:
   a first mobile platform module adapted to support network access via a first radio access technology (RAT) and comprising a first data interface towards the external device; and
   a second mobile platform module adapted to support network access via at least one second RAT and comprising a second data interface towards the external device,
   wherein:
   the first mobile platform module further comprises:
     a first network address management component adapted to perform Internet Protocol (IP) address-related operations; and
     an IP layer;
   the second mobile platform module further comprises:
     a second network address management component adapted to perform IP address-related operations; and
     an IP layer;
   the first and second network address management components are adapted to communicate with each other to perform IP address synchronization among the two mobile platform modules, wherein the IP address synchronization causes the apparatus to act toward the network and to the external device as if the apparatus had only a single IP layer; and
   the IP address synchronization includes transfer of an IP address between the respective IP layers of the first and second mobile platform modules, wherein the IP address has been allocated by the network to which access is provided.

2. The apparatus of claim 1, further comprising at least one control interface adapted to transfer control information towards the external device, the control information being indicative of an availability of network access via at least one of the first RAT and the second RAT.

3. The apparatus of claim 1, wherein at least one of the mobile platform modules further comprises a network interface and a communication path between the network interface with the first data interface.

4. The apparatus of claim 3, wherein the communication path is adapted to selectively bypass the first network address management component.

5. The apparatus of claim 1, wherein each mobile platform module further comprises an inter-platform control interface for inter-platform control signalling.

6. The apparatus of claim 5, wherein inter-platform control signalling relates to at least one of a handover between the first RAT and the second RAT, synchronisation of the first RAT and the second RAT, platform module wake-up, and inter-platform Subscriber Identity Module (SIM) card access.

7. The apparatus of claim 1, further comprising a hub connected to the first data interface and the second data interface, the hub presenting the first and second data interfaces in the form of a single data port towards the external device.

8. The apparatus of claim 1, wherein at least one of the two mobile platform modules further comprises a third data interface to provide an application residing on the apparatus with network access.

9. The apparatus of claim 1, wherein each mobile platform module is realized as a separate integrated circuit comprising the respective data interface and a digital baseband processor supporting the respective RAT.

10. The apparatus of claim 1, wherein the apparatus is configured as at least one of a mobile terminal, a mobile telephone, and a network card.

11. The apparatus of claim 10, wherein the first data interface and the second data interface are realized as separate Universal Serial Bus interfaces presenting the apparatus as Ethernet network card to the external device.

12. The apparatus of claim 1, wherein at least one of the data interfaces is a Universal Serial Bus interface.

13. A method of providing network access by an apparatus to an external device, the method comprising:
   providing a first mobile platform module adapted to support network access via a first radio access technology (RAT) and comprising a first data interface towards the external device;
   providing at least one second mobile platform module adapted to support network access via at least one second RAT and comprising a second data interface towards the external device; and
   selectively routing network traffic to and/or from the external device via one of the first data interface and the second data interface,
   wherein:
   the first mobile platform module further comprises:
     a first network address management component adapted to perform Internet Protocol (IP) address-related operations; and
     an IP layer;
   the second mobile platform module further comprises:
     a second network address management component adapted to perform IP address-related operations; and
     an IP layer;
   the first and second network address management components are adapted to communicate with each other to perform IP address synchronization among the two mobile platform modules, wherein the IP address synchronization causes the apparatus to act toward the network and to the external device as if the apparatus had only a single IP layer; and
   the IP address synchronization includes transfer of an IP address between the respective IP layers of the first and second mobile platform modules, wherein the IP address has been allocated by the network to which access is provided.

14. The method of claim 13, further comprising routing network traffic directly between a network interface of each mobile platform module and the respective data interface bypassing one or more protocol layers in a protocol stack deployed on the mobile platform module.

15. The method of claim 13, further comprising:
generating a control signal indicative of a handover between the two first RAT and the second RAT; and
sending the control signal to the external device.

16. A non-transitory computer-readable medium having stored thereon program code portions for performing a method when the program code portions are run on a computing device, wherein the method is a method of providing network access by an apparatus to an external device, the method comprising:
providing a first mobile platform module adapted to support network access via a first radio access technology (RAT) and comprising a first data interface towards the external device;
providing at least one second mobile platform module adapted to support network access via at least one second RAT and comprising a second data interface towards the external device; and
selectively routing network traffic to and/or from the external device via one of the first data interface and the second data interface,
wherein:
the first mobile platform module further comprises:
a first network address management component adapted to perform Internet Protocol (IP) address-related operations; and
an IP layer;
the second mobile platform module further comprises:
a second network address management component adapted to perform IP address-related operations; and
an IP layer;
the first and second network address management components are adapted to communicate with each other to perform IP address synchronization among the two mobile platform modules, wherein the IP address synchronization causes the apparatus to act toward the network and to the external device as if the apparatus had only a single IP layer; and
the IP address synchronization includes transfer of an IP address between the respective IP layers of the first and second mobile platform modules, wherein the IP address has been allocated by the network to which access is provided.

* * * * *